United States Patent
Oleniczak

(10) Patent No.: US 7,142,874 B1
(45) Date of Patent: Nov. 28, 2006

(54) METHOD AND SYSTEM FOR GEOGRAPHICALLY VERIFYING A WIRELESS SERVICE CUSTOMER

(75) Inventor: Kevin James Oleniczak, Wheaton, IL (US)

(73) Assignee: Sprint Spectrum L.P., Overland Park, KS (US)

( * ) Notice: Subject to any disclaimer, the term of this patent is extended or adjusted under 35 U.S.C. 154(b) by 400 days.

(21) Appl. No.: 10/158,668

(22) Filed: May 30, 2002

Related U.S. Application Data

(63) Continuation-in-part of application No. 10/062,983, filed on Jan. 31, 2002.

(51) Int. Cl.
*H04Q 7/20* (2006.01)
(52) U.S. Cl. .............. 455/456.3; 455/456.1; 455/456.2; 455/456.5; 455/456.6
(58) Field of Classification Search .......... 455/456.1, 455/456.2, 456.3, 456.5, 456.6, 436, 437, 455/438, 439, 440
See application file for complete search history.

(56) References Cited

U.S. PATENT DOCUMENTS

| | | | |
|---|---|---|---|
| 5,657,487 A * | 8/1997 | Doner | 455/456.2 |
| 6,321,090 B1 * | 11/2001 | Soliman | 455/456.1 |
| 6,327,471 B1 * | 12/2001 | Song | 455/440 |
| 6,628,627 B1 * | 9/2003 | Zendle et al. | 370/310 |
| 6,654,609 B1 * | 11/2003 | Kim | 455/437 |
| 6,681,115 B1 * | 1/2004 | McKenna et al. | 455/436 |
| 6,714,789 B1 * | 3/2004 | Oh et al. | 455/456.1 |
| 6,819,919 B1 * | 11/2004 | Tanaka | 455/414.1 |
| 6,996,056 B1 * | 2/2006 | Chheda et al. | 370/209 |
| 2001/0018326 A1 * | 8/2001 | Link | 455/3.05 |

* cited by examiner

*Primary Examiner*—Joseph Feild
*Assistant Examiner*—Huy D. Nguyen

(57) ABSTRACT

A method and system for geographically verifying a wireless service customer. An operating boundary of a first sector is identified and a first transmitting characteristic is assigned to this first sector. The method includes assigning the customer to operate in the first sector and authorizing the customer to operate according to this first transmitting characteristic. Geographic coordinates of the customer are obtained and it is determined whether the customer resides within the first sector. The customer may be reassigned to a second sector if the customer is physically located within a boundary of a second sector. The method and system facilitates better verification of customer location.

16 Claims, 8 Drawing Sheets

METHOD AND SYSTEM FOR GEOGRAPHICALLY VERIFYING A WIRELESS SERVICE CUSTOMER

CROSS-REFERENCE TO RELATED APPLICATIONS

This application is a continuation-in-part application of U.S. patent application Ser. No. 10/062,983 filed Jan. 31, 2002 entitled "Method and System for Customer-Specific Field Testing in a Wireless Communication System," herein entirely incorporated by reference and to which the reader is directed for further information.

BACKGROUND

I. Field of the Invention

The present invention is directed to telecommunications. More particularly, the present invention is directed to methods and systems for geographically verifying a wireless communication system customer. The invention is particularly useful in geographically verifying a point-to-multipoint customer in a Multi-channel Multipoint Distribution Service (MMDS) system. However, aspects of the invention may be equally applicable in other scenarios as well.

II. Description of Related Art

In a typical wireless network, a service provider obtains a license (e.g., a license from the Federal Communications Commission) to provide service to a specified area. This area is divided geographically into a number of cell sites. Each cell site defines a radio frequency pattern, oftentimes referred to as Response Service Area (RSA), from a respective base transceiver station (BTS) antenna. Most cell sites are usually further divided geographically into a number of sectors. Each such sector may be defined respectively by radiation patterns from directional antenna components. These sectors can be referred to as "physical sectors," since they are physical areas of a cell site.

These sectors can be characterized as pie wedges. When a customer premises equipment (CPE), such as an MMDS dish, is first installed or actually physically located within a given sector, under ideal conditions, the CPE should be authorized to operate in this given sector. Once the CPE is properly installed and properly authorized to work within this pre-assigned sector, the CPE will optimally communicate with the base station via communication mechanisms (upstream and downstream) designated for that given sector.

Occasionally, however, because of technician or back office error, imprecise planning, data entry input errors, erroneous location information, or other like problems, it often occurs that a CPE is incorrectly assigned. That is, a CPE is assigned to operate in a first sector but is physically located in a second or different sector. Another problem that may arise relates to pre-assigning a CPE to operate within a particular sector but yet the CPE is physically located outside of the licensed broadcast area or Response Service Area (i.e., the RSA). That is, the CPE is not physically located within any licensed broadcast sector.

Such incorrect assignments pose certain transmission and network assignment concerns. For example, the CPE and/or base station may need to increase their transmission signal strength in order to successfully communicate with one another. Effectively, if an incorrect assignment occurs, the CPE and/or base station overextend or stretch their communications over sector borders. Unfortunately, such an increased signal strength can create certain disadvantages. For example, increased signal strength could result in noise air interference. Such noise can undesirably interfere with communications between the base station and other CPEs residing in adjacent sectors.

Moreover, incorrectly assigned CPE's could also present equipment allocation issues. In addition, a CPE operating while physically located outside an RSA may violate certain rules and regulations underlying the FCC license of the wireless system operator. Such potential violations may place the operators FCC license at risk. There is, therefore, a need for an improved system.

SUMMARY

According to an exemplary embodiment, a method of geographically verifying a wireless service customer is provided that includes the steps of assigning the wireless service customer to a first wireless service sector. Geographic coordinates defining a geographic location of the customer are obtained. It is determined whether the geographical coordinates of the customer reside within a predefined boundary of the first sector.

In another embodiment, a method of spatially verifying a wireless service customer comprises the steps of enabling a wireless service customer to operate according to a transmitting characteristic assigned to a first wireless service sector. Geographic coordinates of the customer are obtained and it is determined whether the geographical coordinates of the customer reside within a predefined boundary of the first sector. Corrective action is taken if the geographical coordinates of the customer is not physically located within the boundary of the first sector.

In yet another alternative embodiment, a method of spatially verifying a point-to-multipoint wireless service customer premises equipment based on geopositional location information is provided. The method comprises the steps of providing a first sector assignment to the customer premises equipment and authorizing the customer premises equipment to operate according to a first transmitting characteristic associated with the first sector assignment. Geopositional location information of the customer premises equipment is obtained. Based on the geopositional location information, it is confirmed whether the customer premises equipment is located within the first sector. A back office system is notified whether the physical location of the customer premises equipment resides within the first sector.

In yet another alternative embodiment, a method of verifying a customer equipment site comprising the steps of assigning the customer equipment site a predetermined geographic location is provided. The method includes capturing geographic coordinates at an actual location of the customer equipment site and comparing the captured geographic coordinates to the predetermined geographic location. Corrective action is taken if the captured geographic coordinates are inconsistent with the predetermined geographic location.

In yet another alternative embodiment, a machine is provided that includes a processor and data storage. Machine language instructions are stored in the data storage and executable by the processor to perform certain functions. These functions include receiving a customer-specific input record, the customer-specific input record indicating a customer premises site and instructing a global positioning receiver to provide latitude and longitude measurements at the customer premises site. An indication of the latitude and longitude measurements is received and the latitude and longitude measurements are verified. A customer-premises output record is generated that records the latitude and longitude measurements.

These as well as other advantages of various aspects of the present invention will become apparent to those of ordinary skill in the art by reading the following detailed description, with appropriate reference to the accompanying drawings.

BRIEF DESCRIPTION OF THE DRAWINGS

An exemplary embodiment of the present invention is described herein with reference to the drawings, in which.

DETAILED DESCRIPTION

MMDS can be used to provide broadband wireless connectivity to a plurality of customer premises. In an MMDS system, a transmitting tower is placed at a high elevation. The transmitting tower provides radio connectivity to multiple sites within a specified coverage area, generally a radius. At each site, a transceiver antenna (typically a dish) is installed on or alongside a building, at a fixed location, to receive signals downstream from the tower and to transmit or send signals upstream to the tower.

MMDS operates in the 2.1 to 2.7 GHz radio frequency range, with data rates of up to 10 Mbps. However, each customer premises site will typically be assigned only a set pair of frequencies within this range. One frequency of the pair will be used for downstream transmissions to the site, and the other frequency will be used for upstream transmissions from the site. Other known transmission methods may also be used, for example, one such methods relates to the time sharing of a same frequency for upstream and downstream transmission.

In a point-to-multipoint wireless system, a base station communicates with fixed customer premises equipment (CPE) located at customer premises sites. Typically, the base station antennae will be designed so as to produce a number of sectors. These sectors can be characterized as pie wedges. These pie wedges are generally disposed around a perimeter of the base station.

Figure 1:
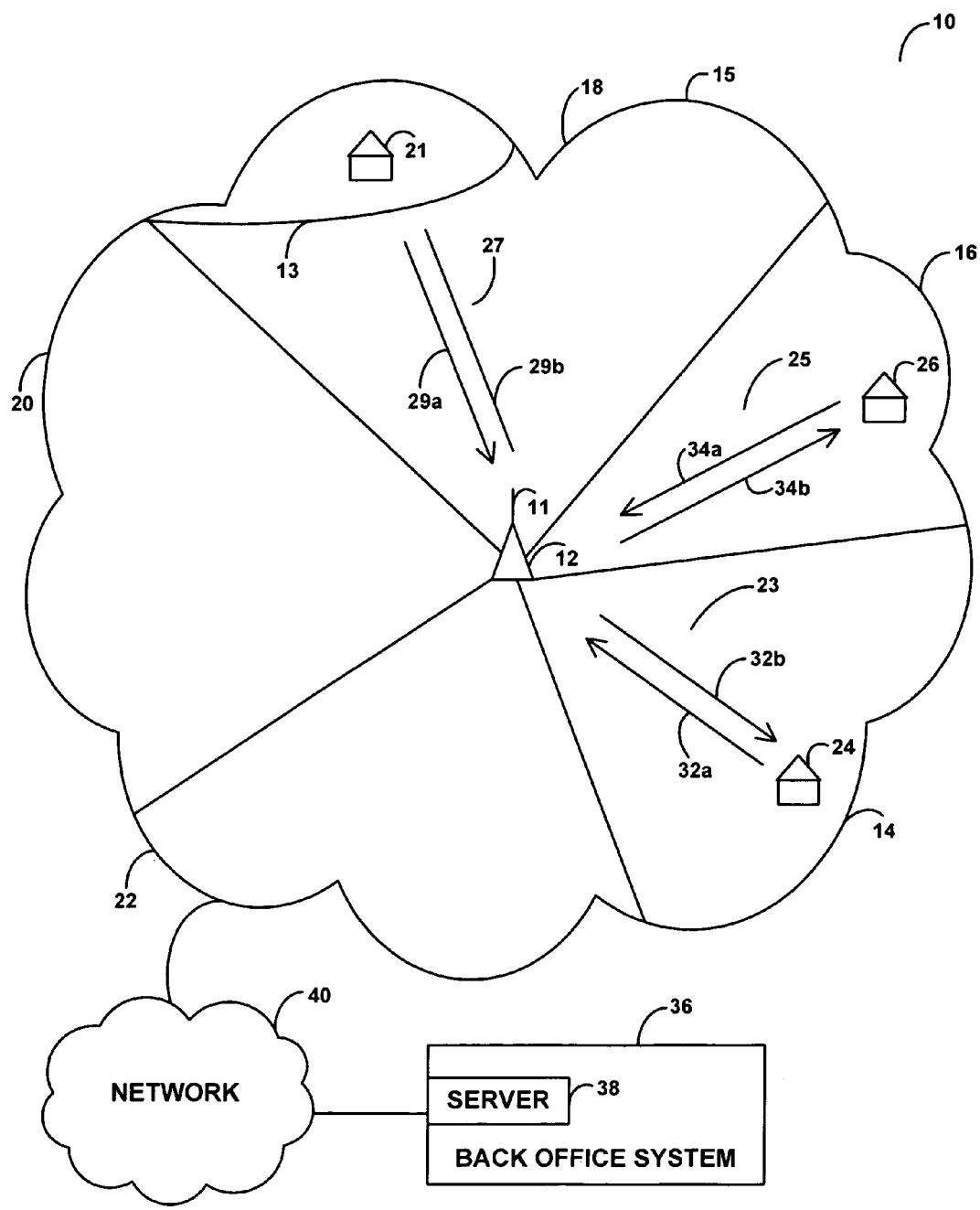
FIG. 1 is a block diagram depicting a wireless system operating in an RSA.

For example, as illustrated in FIG. 1, a point-to-multipoint wireless system 10 is shown. System 10 includes a base station 12 having an antenna 11, a first CPE 24, a second CPE 26, a network 40, and a back office system 30. Information may be communicated upstream from the back office system 30 over the network 40 to the antenna 12 where it is then broadcast over a broadcast area 15.

The base station 12 provides coverage to the broadcast area 15 so as to define a plurality of sectors. In the arrangement illustrated in FIG. 1, station 12 provides coverage to broadcast area 15 comprising five (5) sectors: sectors 14, 16, 18, 20, and 22. Sometimes a specific sector may not reside entirely within an RSA. For example, sector 18, which includes an unlicensed broadcast area 13, does not reside within the RSA. In FIG. 1, then, the RSA could be identified as comprising all of sectors 14, 16, 18, 20, and 22 with the exception of unlicensed area 13. Therefore, based on this illustrated arrangement, although CPE 21 resides within the broadcast area 15, it also resides within an area 13 that is not covered by the RSA of the operator of system 10.

In a typical wireless system, such as the system 10 illustrated in FIG. 1, a plurality of CPE's are positioned in certain sectors or operating boundaries of the broadcast area 15. Based on the location of these CPE's, transmission infrastructure is provided to support the upstream and downstream transmission needs of the various CPEs. However, for ease of discussion, only three CPE's 22, 24 and 26 are illustrated within the system 10. Only two of these CPE's, however, are physically located within the licensed broadcast area: the first CPE 24 and the second CPE 26.

The first CPE 24 is illustrated as being physically located in a first sector 14 while the second CPE 26 is illustrated as being physically located in a second sector 16. Second sector 16 is adjacent first sector 14. A third CPE 21 is illustrated as being physically located inside area 13 and therefore not physically located within a geography defined by the RSA.

The system 10 is set up so that the base station 12 communicates through one or more respective mechanisms to each of the sectors: sectors 14, 16, 18, 20, and 22. System setup may be accomplished via the back office system 30. Each of these sectors will preferably have different transmission mechanisms associated with downstream/upstream transmission. For each sector, the base station may have a designated downstream mechanism for communications from the base station to customer premises equipment in the sector, and a designated upstream mechanism. Such a designated downstream or upstream mechanism could include a frequency, channel, and/or code (as in spread spectrum communications).

For example, the back office system 30 may establish a designated transmission mechanism 25 for communicating between the antenna 11 and the CPE's physically located within sector 16. Therefore, transmission mechanism 25 will be assigned to CPE 26 for communicating with antenna 12. This transmission mechanism 25 could include a downstream mechanism 34a and an upstream mechanism 34b. Similarly, back office system 30 may also establish a transmission mechanism 23 for communicating with CPE's located in sector 14. Therefore, CPE 24 will be assigned transmission mechanism 23. This transmission mechanism 23 could include downstream and upstream mechanisms 34a and 34b, respectively.

Various different transmission mechanisms may be established. For example, the downstream mechanism 34a for CPE 26 may be different than or the same as the downstream mechanism 32a for CPE 24. Similarly, upstream mechanism 34b for CPE 26 may be different or the same as the upstream mechanism 32b used for CPE 24. Alternative arrangements may also be used. For example, in one arrangement, adjacent sectors could have different upstream transmission characteristics but similar downstream transmission characteristics. So, for example, the downstream transmission characteristic 34b for sector 16 and 32b for sector 14 could operate via the same frequency while the upstream transmission characteristic 32*b* and 34*b* may operate via different frequencies.

Normally, when a CPE is initially installed, an installation or repair (IR) technician installs the CPE. This newly installed CPE is assigned to a specific sector. Typically, the CPE is sector assigned by entering certain location data such as a street address or a local address that is relatively close to the actual position of the CPE. In one arrangement, a geocoder (preferably located at the back office) assigns a sector (operating characteristics) to this entered location.

Returning to FIG. 1, a new CPE may be installed to operate within one of the sectors 14, 16, 18, 20, or 22. During installation, the new CPE is assigned to operate according to the transmission characteristic of a given sector. Such a sector assignment takes place at a back office system (e.g., an administrative office) 30. Alternatively, such a sector assignment takes place in the field by the technician via a computer. Therefore, the CPE is assigned to operate according to predefined upstream and downstream transmission characteristics designated for a particular sector based on the CPE's location.

Since CPE 24 is physically located in sector 14, CPE 24 should be assigned to operate in accordance with those mechanisms assigned to sector 14. That is, CPE 24 should be assigned to operate according to transmission mechanism 23 of sector 14. In this manner, CPE 24 is programmed to communicate with base station 12 via the designated upstream mechanism 32*b* and via the designated downstream mechanism 32*a*. Similarly, CPE 26 is programmed to communicate with base station 12 via the specified transmission mechanism 25 of sector 16. CPE 26 is programmed to communicate with base station 12 via the designated upstream mechanism 34*b* and via the designated downstream mechanism 32*a*. However, do to the various types of errors discussed above, CPE 24 may be incorrectly "located" in or assigned to operate in sector 16 and thereby programmed to operate via transmission mechanism 25. Alternatively, a CPE physically located outside of the license broadcast area (RSA) may be incorrectly placed within the licensed broadcast area 15. For example, even though CPE 21 is physically located inside the broadcast area 15 but within the unlicensed area 13, the back office system 30 may incorrectly assign CPE 21 to communicate via the transmission characteristics of sector 18. This could potentially be a violation of the FCC license underlying the RSA.

During installation, the technician may assign CPE 21 a physical location inside of sector 18. Consequently, based on this location, CPE 21 may be assigned to communicate via designated transmission characteristics 27 even though these characteristics 27 should be used for those CPE's physically located in licensed areas of sector 18. Under this scenario, CPE 21 will be incorrectly programmed to communicate with base station 12 via the designated upstream mechanism 29*b* and via the designated downstream mechanisms 29*a*.

Figure 2:
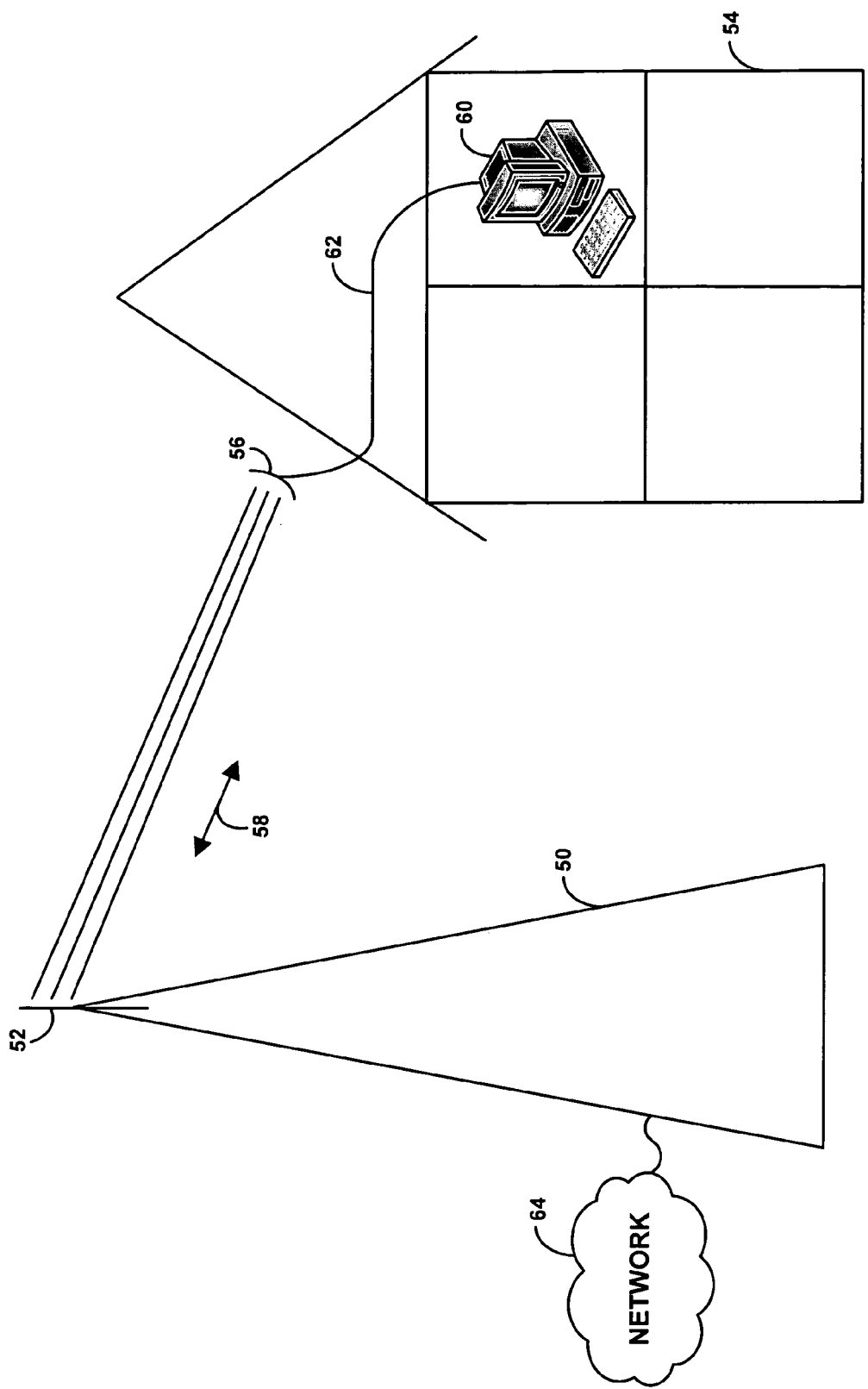
FIG. 2 is a block diagram depicting an MMDS system that may be used within the wireless system illustrated in FIG. 1.

FIG. 2 generally depicts a Multi-Channel Multipoint Distribution Service (MMDS) system that can operate according to the wireless system illustrated in FIG. 1.

As shown in FIG. 2, a transmitting tower 50 is typically placed at a high elevation and includes an antenna 52, which produces a radiation pattern that defines a coverage area of the tower. This coverage area of the tower 50 could be the broadcast area 15 illustrated in FIG. 1. An authorized site within the coverage area may then be equipped with a corresponding antenna so as to be able to exchange signals with the MMDS tower.

FIG. 2 further depicts as a representative site a house 54 having an MMDS antenna dish 56 installed on its roof. Alternatively, the dish might be installed elsewhere, such as on the side of the house or on a separate tower adjacent to the house. Dish 56 functions to communicate with MMDS antenna tower 50 via a link 58, receiving signals downstream from the tower and sending signals upstream to the tower. For example, in one arrangement, where the house 54 is physically located in sector 16 illustrated in FIG. 1, the link 58 operates in accordance with the transmission characteristic 25.

In the arrangement shown in FIG. 2, house 54 contains a computer 60 (or other CPE device). The computer is coupled to the MMDS dish 56 by a suitable link such as a coaxial cable 62. (Intermediate devices or arrangements may be present as well.) Further, MMDS tower 50 is preferably coupled to a broadband network 64 such as the Internet. Therefore, computer 60 may communicate with entities on network 64 through a communication path comprising cable 62, dish 56, link 58 and tower 50. This arrangement thereby provides broadband network connectivity for a user of computer 60.

In an ideal arrangement, link 58 would perfectly carry signals between tower 50 and dish 56, with no degradation in signal quality. However, obstructions such as land, trees, other buildings and other transmission systems between the site and the tower can interfere with the MMDS transmission (and, in turn, with other MMDS transmissions). Therefore, an additional need exists to ensure that dish 56 can adequately communicate with tower 50.

Moreover, as noted above, having the computer device 60 identified as physically residing in an incorrect sector, that is a sector that the device 60 is not physically located in, can also interfere with the MMDS transmission (and, in turn, with other MMDS transmissions). Therefore, as more fully explained above, a further need exists to optimize communications between dish 56 and tower 50.

According to an exemplary arrangement, the process of verifying that a given CPE indeed resides within a licensed broadcast area and/or is correctly assigned to a sector can be automated through use of a method and system that verifies CPE sector assignment accuracy.

When a technician visits a customer site to initially install an MMDS dish, the technician can test for signal strength while also verifying the dish's physical location. To perform this testing, the technician applies a test meter to test signal strength at the position where the MMDS dish will be installed. To do this, a dish may be attached to the end of a long fiberglass rod and held up to the necessary spot. A cable (typically coaxial) will then extend down from the dish and be coupled with the test meter. Upon activation, the test meter may then measure the strength of signals being received by the dish at the test position.

In addition to measuring signal strength, while at the customer site, the technician can also verify the customer's physical location. Based on this verification, the technician can confirm that the customer has been properly authorized to operate within its designated sector. The technician can also verify whether the customer resides within an RSA. To achieve this physical location verification, either the test meter or other type of global positioning device (such as a GPS receiver) verifies customer location information. Based on the results of this customer location information, this information can then be used as the basis to initiate some form of corrective action, if indeed any corrective action is required.

Various corrective actions may be necessary. For example, where the CPE is identified as residing in an incorrect sector, the CPE customer information could be updated to include the correct sector. In addition, where the CPE is physically located outside the RSA, the appropriate field service support could be notified. These corrective steps could be initiated either in the field, at the back office, or automatically. For example, the service and repair technician could initiate sector reassignment while the technician is still in the field (via computer or hand held device). Alternatively, the technician could transmit the GPS location information to the back office where field service technicians could review the location information and make a determination whether corrective action was necessary. Such actions could include confirming that the CPE is physically located within the RSA and that the CPE is indeed operating in an optimal manner by utilizing a correctly assigned operating mechanism (upstream/downstream parameters).

Alternatively, where a technician visits a customer site to maintain an existing (already-installed) MMDS dish, the technician may similarly run a cable from that existing dish to the test meter and take signal strength measurements. In one arrangement, where a GPS receiver is included in an enhanced test meter, the technician can also run a location check with the enhanced test meter to obtain geopositional information for that customer's location. Alternatively, the technician could use a stand alone GPS receiver to verify the customer's location.

According to an exemplary arrangement, the process of measuring and reporting signal quality can be automated through use of a method and system that assists the technician and that helps ensure accuracy of the measurements. According to another exemplary arrangement, the process of obtaining, reporting, and verifying location information can be automated through the use of a method and system that assists the technician and to help ensure that a CPE operates within a licensed area and also ensures accuracy of sector assignment.

1. Overview

Generally speaking, in accordance with an exemplary arrangement, a computer (e.g., a computer located in the field or located at a back office system) may be programmed with a software application. Preferably, this software application is a Windows desktop application that automates several tasks involved with installing and/or maintaining wireless service at a customer's location.

This software application (i) receives a customer-specific record relating to a customer premises site, (ii) outputs a control signal to cause a global positioning device to obtain customer premises location information, (iii) receives the location information from the global positioning device, and (iv) outputs a customer-specific record indicating that the location information was obtained. Based on this customer-specific record, the technician, the computer, or other device may initiate certain necessary actions to update, modify, or revise customer-specific record data, such as the transmission characteristics designated for the customer premises site.

In operation, at the beginning of a work day, a technician can load into the application (e.g., from a remote access server at main office such as the back office system illustrated in FIG. 1) a set of customer-specific input records for the day. Each customer-specific input record may have a corresponding customer identifier (e.g., account number) and may define an address (preferably geo-coded) of a customer premises site and a downstream MMDS frequency that has been assigned to the site. Each customer-specific input record may also include the sector where the customer has been pre-provisioned to operate.

Further, the record may define an appointment time, when the technician is to visit the site for installation or service. Through a suitable graphical user interface, the program may then display a schedule and map, indicating where the technician should be throughout the day.

When the technician arrives at a given site, the technician may connect the computer with the test meter that includes the global positioning device. A connection may be made through a USB, parallel or serial port or through a proprietary port. And the technician may then select an indication of the customer account or site at issue. In response, the application may then retrieve from the customer-specific input record for that account an indication of the downstream frequency assigned to the site. In turn, the application may output a control signal that will cause the test meter to measure signal strength at the indicated frequency.

Alternatively, the application may retrieve from the customer-specific input record for that account data relating to the pre-provisioned sector information. In this manner, the computer will be able to determine what sector the customer has been assigned to operate in. In turn, the application may output a control signal that causes the global positioning device to obtain location information of the CPE, such as the customer's computer 60 illustrated in FIG. 2.

Ordinarily, the customer's pre-provisioned information is obtained by geocoding the customer's address where the CPE will be installed or serviced. Preferably, a geocoder returns the latitude and the longitude coordinates based on a vendor specific algorithm. The algorithm interpolates the location on the customer's street between two intersections. The method of establishing this interpolation from these two intersections is sometimes referred to as street-line-center method. As described more fully above, these coordinates can be significantly skewed from the customer's true position, thereby causing a pre-provisioning assumption to be incorrect.

In an exemplary arrangement, a control signal may be one or more direct commands to the test meter or to the global positioning device. These commands instruct either the meter and/or the global positioning device to take a particular measurement, to generate particular location information, or to take some other defined action (similar to if a user had pressed a button on the device to cause the device to take a designated action).

Alternatively, the control signal may be more of a macro, or script, that can be loaded into memory on the device and executed by the device so as to cause the device to take one or more designated measurements. (Ideally, such a macro would be written in a standard language, such as XML. However, more likely, the device will define a proprietary scripting language to which the macro provided by the computer will have to comply.)

Pursuant to the control signal, the test meter will therefore test downstream signal strength at the position where an MMDS dish has been installed or will be installed. Pursuant to another control signal, the test meter or global positioning device will obtain GPS position data. Where the test meter includes a global positioning receiver, the test meter will therefore provide the global positioning data pursuant to a control signal. The meter may then record the measured signal strength and the location information in its memory. The global positioning device may then also record the GPS position data information.

Thereafter, if the test meter or GPS receiver remain coupled to the computer, the test meter or receiver may automatically report the customer's location data to the computer or may report the location data to the computer in response to a triggering event (such as instruction by the technician). Alternatively, if the technician had de-coupled the test meter or receiver from the computer, the technician may then re-couple the test meter or receiver and computer and, similarly the receiver may report the measurement data autonomously or in response to a triggering event.

In an exemplary arrangement, the computer, the test meter, and the GPS receiver are independent, stand alone devices. Alternatively, either the test meter or the computer may be equipped with the GPS receiver. Yet another alternative arrangement would provide a computer that includes both a test meter and a GPS receiver. This GPS receiver provides an indication of the geographic location (e.g., the customer's latitude and longitude coordinates) where the measurement is taken. Usually, the location information is obtained while the technician is near a CPE, preferably while the GPS receiver is near the customer's dish, such as the dish 56 illustrated in FIG. 2.

In some circumstances, location information may be obtained while the technician is near a customer's driveway or near the customer's residence. The GPS receiver may also provide a timestamp indicating when the location information was obtained. If the computer includes (or accesses) the GPS receiver, then the computer may record the location and timestamp information together.

Based on the location information, the application on the computer may automatically establish a new customer-specific output record or, for existing customers, the computer may automatically revise or update a customer-specific output record. The customer-specific output record will preferably identify the customer, provide the GPS location information, and provide a date and time when the location information was obtained.

The customer-specific output record could be updated or revised in other ways as well. For example, where the computer updates the customer-specific output record, the record could also include information as to whether the customer resides in an RSA, the designation of the customer's previously assigned sector, the GPS location information and what sector within the system this GPS location information maps to, and could also identify any newly assigned sector (if this reassignment is indeed required).

Importantly, the customer record could also instruct the technician or alternatively the back office as to whether the customer was previously assigned outside an RSA or previously assigned to an incorrect sector. The customer record could also, therefore, provide instructions as to whether any corrective action, revisions, or required updates, for example, reassigning the CPE to a new sector based on the recently derived GPS location information. The record could also include information as to whether the customer resides within the RSA and if not, the record could provide action steps.

In an alternative arrangement, the function of the computer could be integrated as part of the test meter or alternatively part of the GPS receiver, in the form of a more intelligent computerized test meter, or enhanced test meter. As such, customer-specific input records could be loaded directly into the computerized test meter, and a processor in the test meter could execute the application (when invoked) to take the designated measurements, to generate CPE location information, or to generate the customer-specific output record.

Based on whether new location information was obtained, the technician may then have a number of options. First, the technician could utilize the application to send the revised customer-specific output record to the main office (again, through communication with a remote access server at the main office, or through some other means). There, the customer-specific data could be analyzed, and any desired follow up action can be taken. For example, where it is determined that the CPE is physically located outside of its current operating sector, the CPE could be reassigned to a new sector. Also, where it is determined that the CPE is physically located outside of a RSA, the service to the CPE may need to be cancelled.

Alternatively, these decisions and actions may be initiated by the technician at the computer while the technician is still in the field. In one arrangement, the technician utilizes the application to revise a customer-specific output record. The technician customer-specific data could be analyzed, and any desired follow up action can be taken. For example, where the technician determines that the CPE is physically located outside of its current operating sector, the technician could reassign the CPE to operate according to the transmission requirements of a new sector. Also, where the technician determines that the CPE is physically located outside of the RSA, the technician may cancel the CPE's service or perhaps take other corrective action. In the field modifications would provide the system with certain advantages, efficiencies, and customer advantages.

2. Exemplary Architecture

Figure 3:
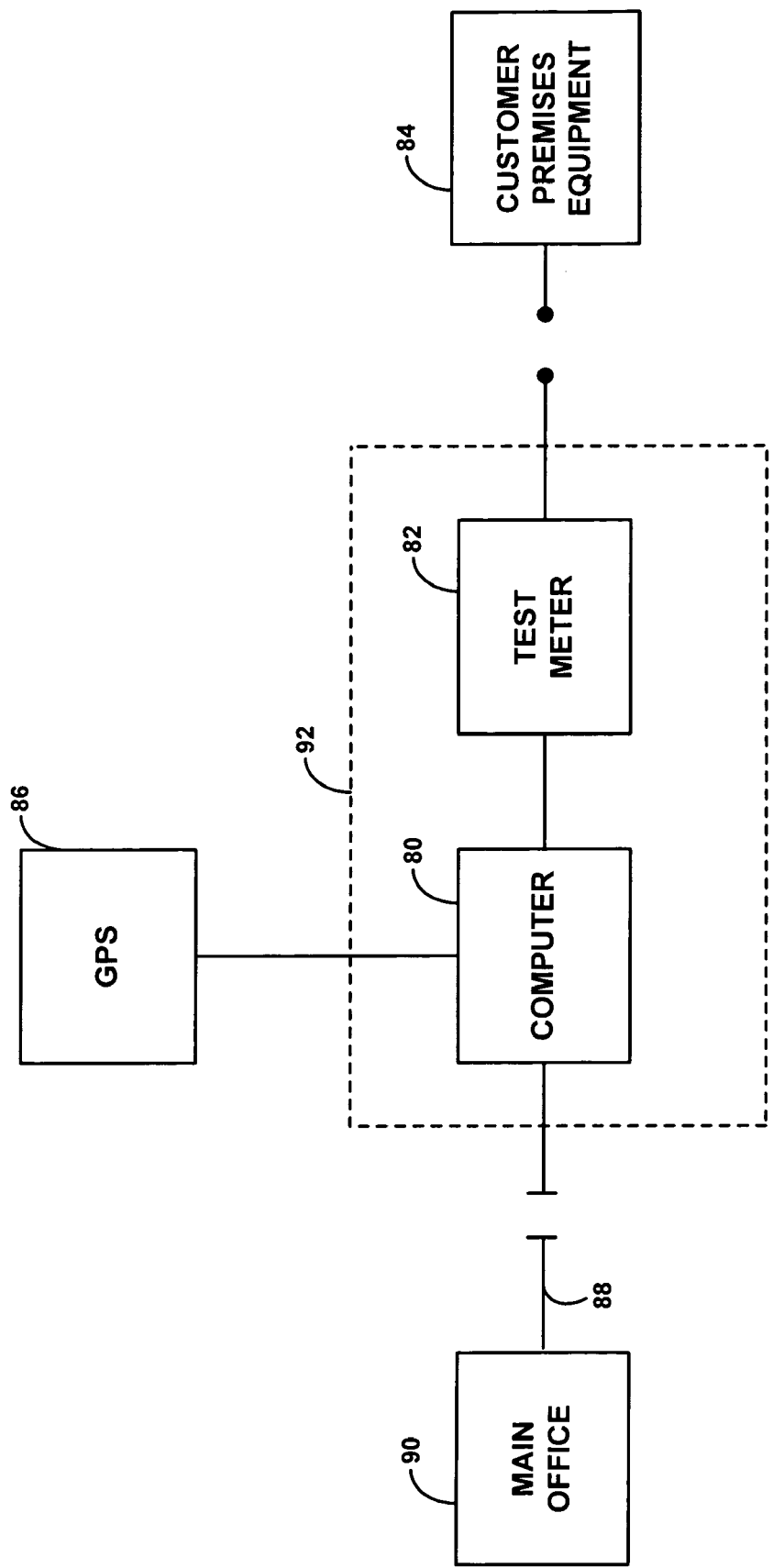
FIG. 3 is a block diagram of an arrangement for carrying out an exemplary embodiment.

Referring next to FIG. 3, a simplified block diagram is shown, illustrating one possible arrangement of this system. As shown in FIG. 3, a computer 80 is coupled with a test meter 82, through a suitable communications port. (For instance, the test meter 82 may have a proprietary or standard port of some sort, and a corresponding cable may then be provided to link between that port and an I/O port on computer 80.) In turn, where a global positioning unit is provided within the test meter 82, the test meter 82 functions to obtain measurements and other location information at customer premises equipment 84.

In one arrangement, the test meter includes a GPS receiver. Alternatively, the GPS receiver may be provided in the computer 30. In yet another arrangement, a GPS receiver 86 is provided as a stand alone device. Such a stand alone device could be coupled either to the test meter, the computer, the main office, the customer premises equipment, or other processing device.

As further shown, computer 80 may be coupled via a link 88 with a main office 90. For example, the link 88 may be with a server at the main office, such as the server 38 illustrated in the back office system 30 of FIG. 1. As such, link 88 can take various forms. Further, link 88 may represent multiple different links, possibly one link used for downloading customer-specific input records from the main office to the computer, and another link used for reporting customer-specific output records from the computer to the main office. Alternatively, link 88 might be a single link.

In yet another arrangement, link 88 may represent multiple different links, possibly one link used for downloading customer-specific location information from the main office to the computer, and another link used for reporting newly obtained location information from the computer to the main office.

In one arrangement, link 88 enables the computer 80 to access customer-specific records so as to determine whether the CPE is correctly assigned within a broadcast area or RSA. For example, once the GPS receiver 86 obtains location information for either a newly installed CPE or an existing CPE, the computer 80 can compare this location information to the previously assigned location information for that CPE. If a match is found, the computer can update the record so that the record reflects that the location information was generated and that the assignment location information was confirmed. Alternatively, this assignment location information could be communicated by computer 80 (or the test meter 82 or the separate GPS receiver 86) over a transmission link (such as link 88). Record updating, RSA verification, and sector reassignment and verification could then be performed at the main office 90. Alternatively, these processes could be performed directly at the CPE location via the computer 80.

Where the computer 80 determines that the CPE 84 is located outside of the RSA or has been assigned an incorrect sector, the computer 80 can update the customer specific record. Alternatively, the computer 80 can forward the location information over link 88 to the main office 90 wherein the main office 90 updates the customer specific record to include new or a revised CPE location information.

Link 88 can be a wireless and/or landline link suitable for carrying data between computer 80 and main office 90. For example, link 88 could be a landline network connection, through the public switched telephone network (PSTN) and/or through a packet-switched network such as the Internet. As another example, link 88 could include a wireless connection. For instance, computer 80 might include a cellular or PCS module that facilitates communication via an air interface with a radio access network (such as the Sprint PCS network), and the radio access network can in turn provide connectivity (e.g., through the PSTN or the Internet) to main office 90.

Preferably, such a wireless link would provide 3G or later data connectivity. For instance, the PCS module may establish a data link according to the industry standard "point-to-point protocol" (PPP) with a packet data serving node (PDSN), which then provides connectivity with the Internet. A remote access server at the main office may then sit on the Internet as well so that the PCS module can communicate via the PPP link and Internet with the remote access server. But other arrangements are possible as well.

As mentioned above, computer 80 and test meter 82 may alternatively be integrated together into a single device. FIG. 3 depicts such a device as an enhanced test meter 92. Enhanced test meter 92 would maintain many of the functions of computer 80 and test meter 82, but could be more efficient, at least because it could alleviate the need to physically couple a computer with a test meter. Enhanced test meter 92 could be additionally arranged so as to include the GPS receiver 86. Such an enhanced device could conveniently include a single processor (rather than separate processors for the computer and the test meter), which could reduce cost as well.

It should be understood that the arrangement shown in FIG. 3 may not exist at all times or indeed at any time in particular. Rather, the figure serves to illustrate interconnections and relationships that may exist at various times between various components in an exemplary arrangement.

For example, computer 80 might not be connected to link 88 while the computer is connected to the GPS receiver 86. Alternatively (depending on what type of link 88 is provided, for instance), computer 80 might always be connected (wired or wirelessly) with link 88. And as another example, GPS receiver 86 might not be connected with computer 80 when GPS receiver 86 is positioned to obtain and record location information at CPE 84. Or, alternatively, it may be coupled (via a cable or wireless connection) to the computer during that process.

Figure 4:
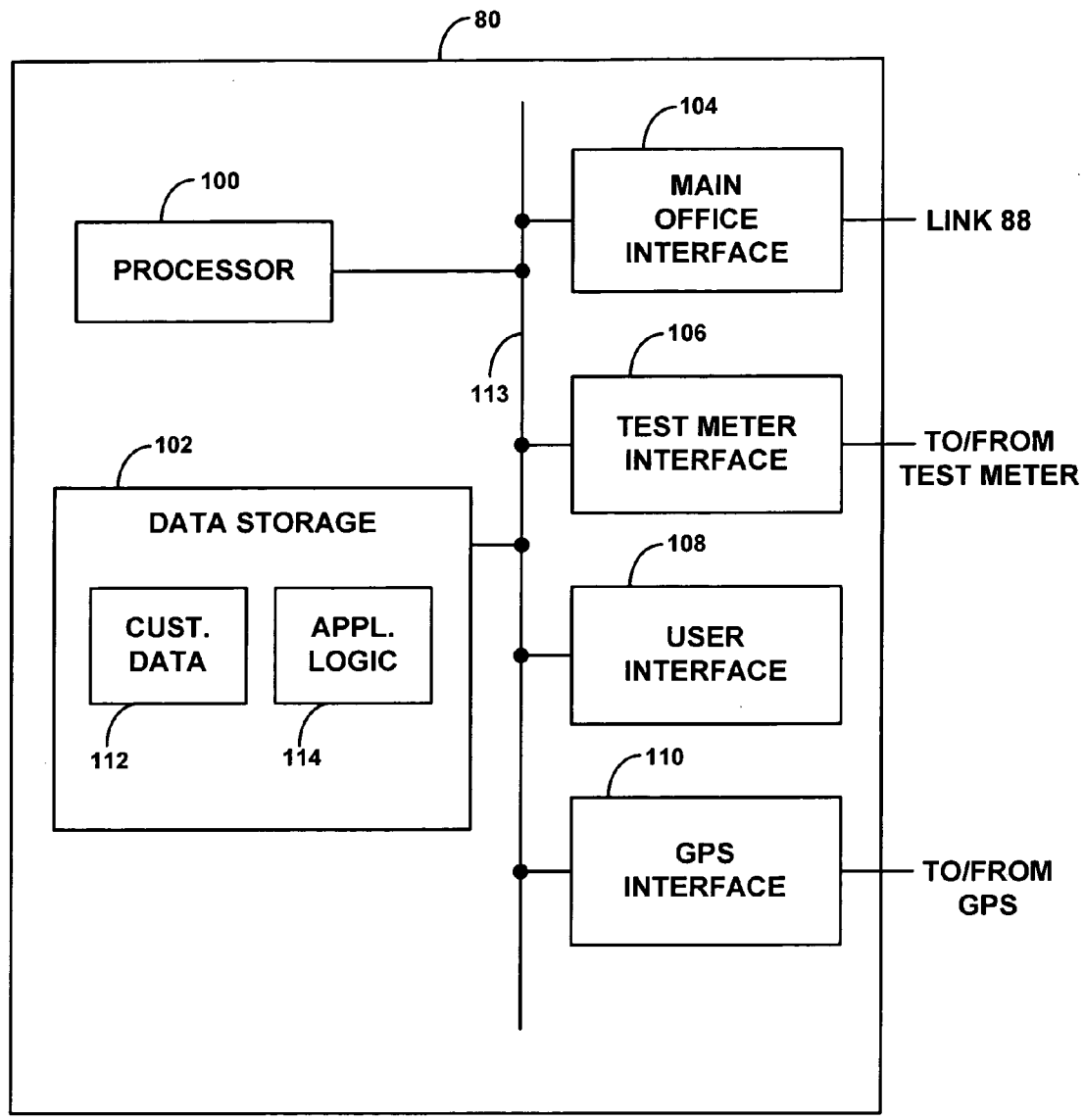
FIG. 4 is a block diagram showing example components of the computer depicted in FIG. 3.

Referring next to FIG. 4, a block diagram of an exemplary computer 80 is shown. As illustrated, exemplary computer includes a processor 100, data storage 102, a main office interface 104, a test meter interface 106, and a user interface 108, each of which may be coupled together via a system bus 52. Where the GPS receiver is coupled directly to the computer 80, a GPS interface 110 may also be provided. Alternatively, the GPS receiver is provided in the computer 80.

Processor 102 may be any computer processor, such as an Intel Pentium class processor for instance. Data storage 102 in turn may also take various forms, such as volatile and/or non-volatile memory, and/or magnetic or optical disk storage. In the exemplary arrangement, data storage may store customer-specific data 112 and application logic 114.

In one arrangement, measurement location is established through use of the global positioning system (GPS) receiver. An output record may include GPS metadata, which can assist in later analysis to determine if the GPS measured location coordinates were accurate. Additionally, the output record could include information, such as a serial number, that identifies the GPS unit used to perform the measurement(s). This information can facilitate tracking, so as to allow a later identification of all customers who were affected by a faulty GPS unit, for instance.

Application logic 114 may include machine language instructions that are executable by processor 100 to carry out various functions described herein. Examples of those functions include (i) receiving and storing customer-specific input records, (ii) interfacing with a technician through user interface 108, such as to present the technician with a daily installation schedule and to receive user commands from the technician, (iii) producing and providing a control signal to GPS receiver 86 via interface 110, to cause GPS receiver 86 to obtain location information at the customer site, (iv) receiving location information from the GPS receiver via interface 110, (v) generating customer-specific output records, and (vi) reporting the customer-specific output records via main office interface 104 to the main office.

Main office interface 104 is an interface suitable for providing communication over link 88 with the main office. As such, main office interface 104 can take various forms, depending on the form of link 88 at computer 80. For example, if link 88 provides a simple PSTN connection, main office interface 104 might be a data modem with telephone port. As another example, if link 88 provides an Ethernet link to the Internet, main office interface 104 might be a suitable network interface module. And as another example, if link 88 provides a PCS wireless link, main office interface might be a PCS communication module (e.g., a PCMCIA card or other such module, or a discrete PCS device (e.g., cellular telephone) coupled with the computer).

Similarly, user interface 108 may also take various forms. Preferably, user interface 108 will include a user output mechanism, such as a display and/or audio speakers, and a user input mechanism, such as a keypad/keyboard and/or a microphone. Other arrangements are also possible.

Figure 5:
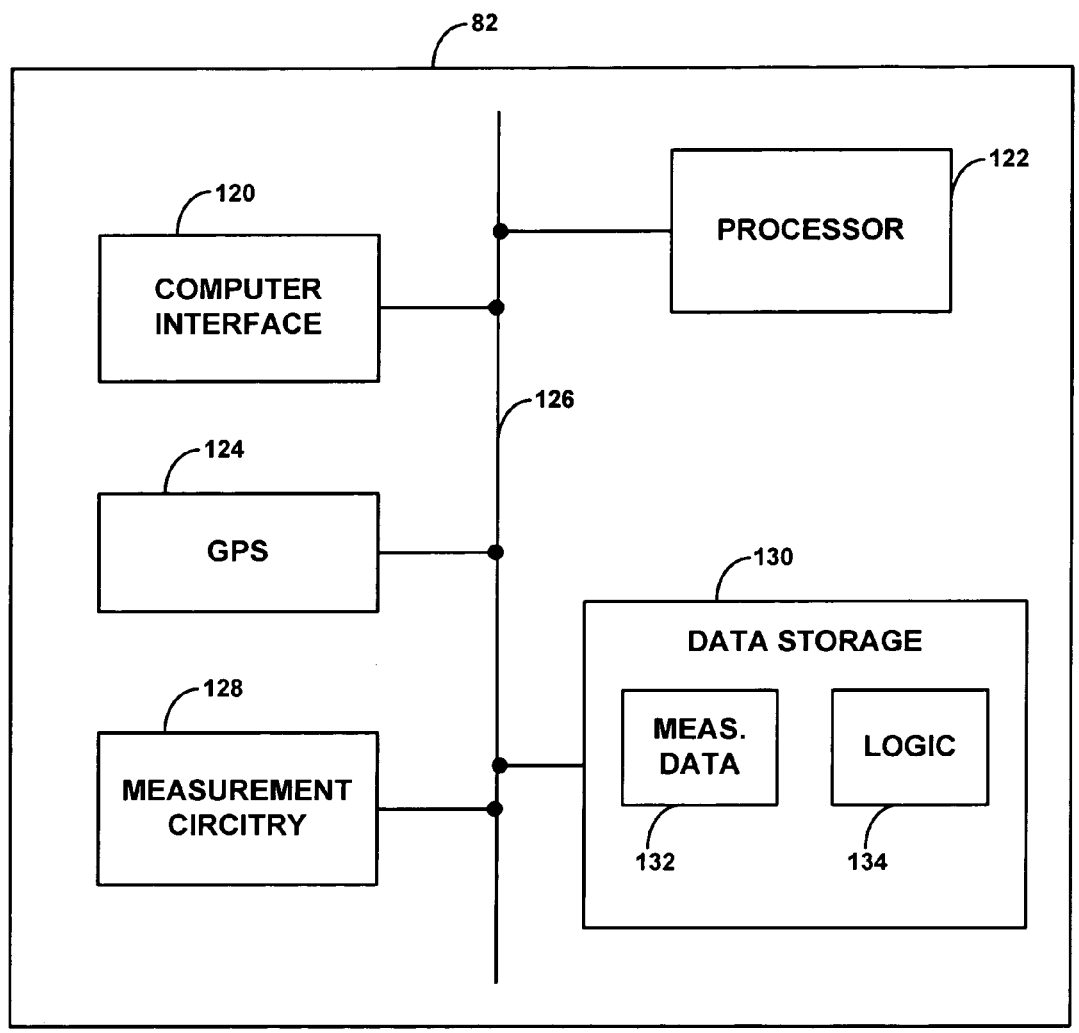
FIG. 5 is a block diagram showing example components of the test meter depicted in FIG. 3.

Referring next to FIG. 5, a block diagram of an exemplary test meter 82 is shown. As illustrated, the exemplary test meter includes a processor 122, data storage 130, a computer interface 120, and measurement circuitry 128, all coupled together by a system bus 126. As with computer 80, these various components may take a variety of forms to carry out the functions described herein.

In an exemplary embodiment, data storage 130 contains application logic 132 and measurement data 134. The application logic 132 is executable by processor 134 to carry out various functions described herein. For instance, the application logic may include macro scripts that have been provided to the test meter by computer 80 and that direct certain measurements to be taken (possibly at certain times). Further, the logic preferably functions to interface with measurement circuitry 128 so as to take the designated measurements (again, possibly at the designated times) and to thereby establish the measurement data 134. In turn, the logic may function to report the measurement data 134 to the computer, autonomously or upon request (e.g., in response to a query from computer 80).

Measurement circuitry 128 can in turn take various forms. Preferably, measurement circuitry 128 will include a coaxial cable port to facilitate a cable connection to an MMDS dish or other antenna that will receive signals to be measured. Alternatively, measurement circuitry 128 may itself include an antenna for receiving signals to be measured. In turn, the measurement circuitry includes a mechanism to measure the strength of received signals.

In addition, as shown in FIG. 5, where the GPS receiver is not provided as a stand alone device, the test meter may include a GPS receiver 124. Receiver 124 functions to obtain highly granular location information from a GPS satellite (not shown) in a manner well know to those of ordinary skill in the art. Through use of this GPS receiver, application logic 134 can record together with signal quality measurements a fairly precise indication of the location (e.g., latitude/longitude coordinates) for sector verification. (Note that, alternatively or additionally, computer 80 could include or access a GPS transceiver and could itself record location information in conjunction with the measurement data 134 that the computer receives from the test meter. Still alternatively, location information can be acquired, recorded, and confirmed in other ways as well.)

Figure 6:
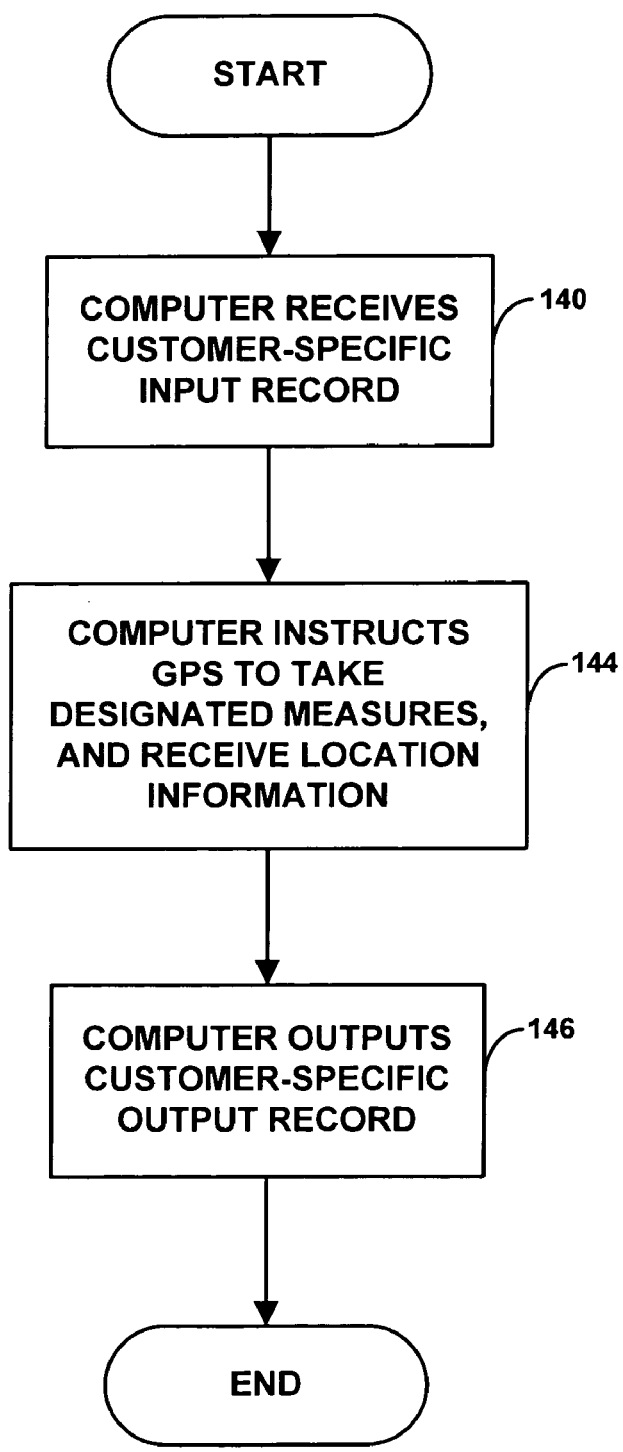
FIG. 6 is a flow chart depicting functions that may be carried out in accordance with one aspect of an exemplary embodiment.

Referring next to FIG. 6, a generalized flow chart is provided to illustrate functions that may be carried out in accordance with the exemplary arrangement. As shown in FIG. 6, at block 140, a computer located at a back office receives an input record. This input record could indicate at least one customer physical location that is to be verified at a customer premises site. For an existing customer, this input record could also designate certain geographical location information of the existing customer. The input record could also designate sector assignment information.

In turn, at block 144, the computer instructs the GPS receiver to measure the location information at the customer premises site and to then receive from a device a value of each location data point as measured at the customer premises site. The device could be a standalone GPS receiver, transceiver, test meter, or computer. Thereafter, at block 146, the computer outputs a customer-specific output record. This output record identifies the value of the data point as measured at the customer premises site. This output record also identifies the value of the location information data as measured at the customer premises site.

Alternatively, at block 144, the computer receives this newly generated customer location information. The computer compares the newly derived geographical location to a sector mapping routine. In this manner, once provided with the GPS location information of the customer, the computer can determine in which sector the customer premises site is located.

Based on this comparison, the computer can update or leave the characteristics alone. If, for example, the computer determines that the CPE resides in a first sector and the CPE has been assigned to operate in this first sector (a correct sector), no change is made to the operating characteristics.

Alternatively, if the computer determines that the CPE resides in a first sector and the CPE has been assigned to operation in a second sector (an incorrect sector), the technician can initiate reassignment (via the computer or otherwise). In other words, reassignment may be initiated by notifying a back office system that reassignment must take place. Alternatively, the technician can utilize the computer to authorize a sector reassignment and also change to the transmission characteristics of the incorrect assigned CPE.

For example, returning to FIG. 1, the back office 30 is provided with server 38. Server 38 could instruct the GPS receiver to determine the location of the first CPE 24. Once the location device determines the location of CPE 24, it will transmit this information over the network 40 to the server 38 located at the back office system 30. Once it receives this location information, the back office system compares this location information to the assigned location information. If there is a match, the CPU does not perform a change. Alternatively, if the GPS location information does not match the currently assigned location information, a sector reassignment may be authorized. The CPU or other device will then update the assigned location information to now include the correct location information, i.e., that the first CPE 24 is located in sector 14, not sector 16. Consequently, the first CPE 24 will operate in accordance with transmission characteristics 32 rather than the transmission characteristic 34 of sector 16.

Figure 7:
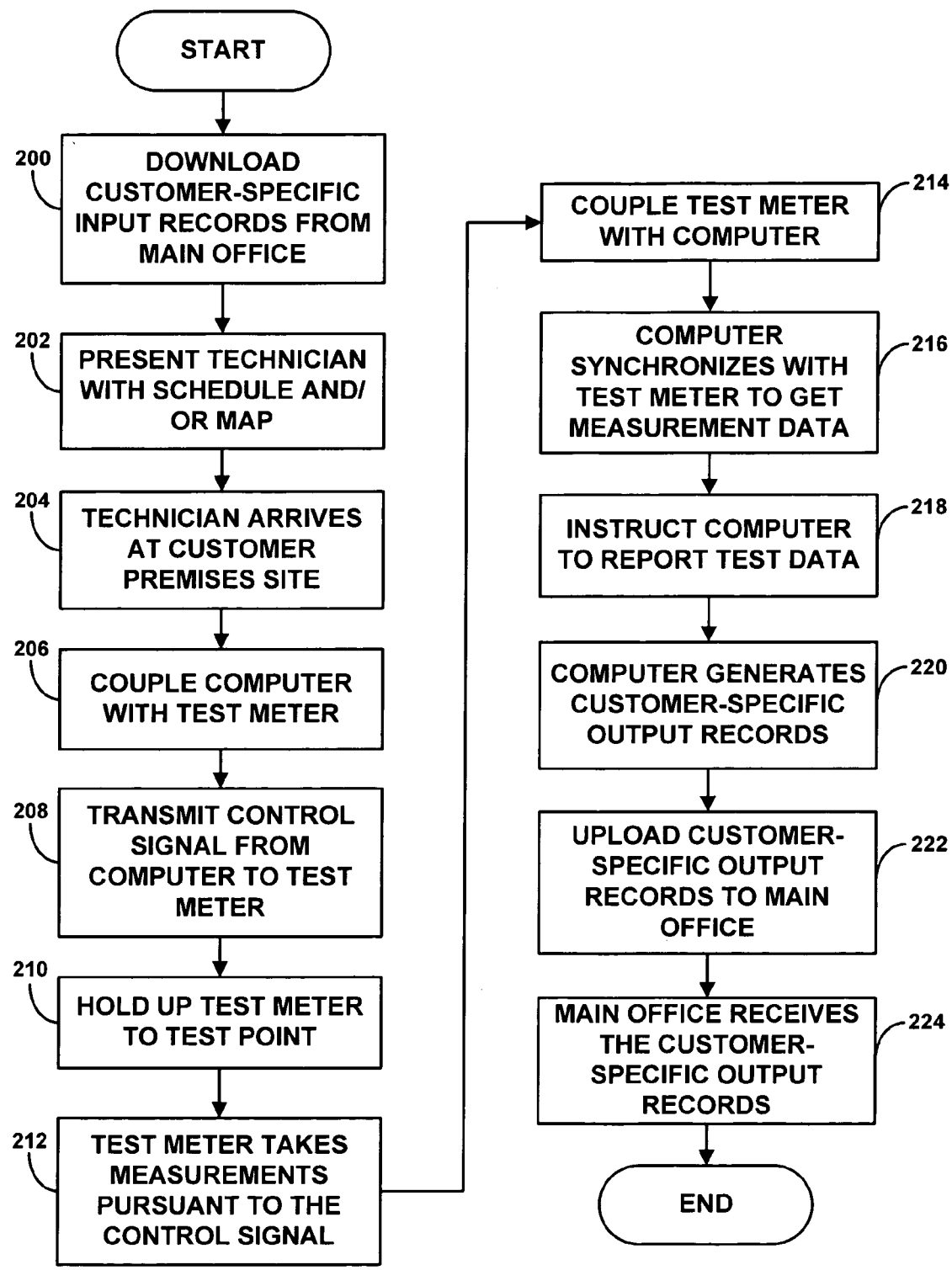
FIG. 7 is another flow chart depicting functions that may be carried out in accordance with one aspect of an exemplary embodiment.

Referring next to FIG. 7, a more detailed flow chart is provided, to help further illustrate functional operation of the exemplary arrangement. It should be understood that the particular order of functions as set forth and described here (and in connection with other processes) can vary from that presented. Further, while some of the functions are described as being performed in response to operator input, it should be understood that some or those functions may be instead performed automatically by the computer and/or test unit. In fact, by automating many of these functions, an operator's performance can be better controlled and supervised, and the measurement and reporting quality can improve.

As shown at block 200 of FIG. 7, a technician causes computer 80 to download from main office 30 (FIG. 1) a set of customer-specific input records for the day. For instance, the technician can invoke a management application on the computer, which causes the computer to establish a network link with the remote access server 38 at the main office 30. Through that link, the computer may provide the main office with a technician-ID, and the main office may then responsively send to the computer the customer-specific input records defining the technician's installation/maintenance appointments for the current day.

At block 202, the management application causes the computer to present to the technician a schedule of installation/maintenance appointments for the day and/or a map of where the technician should be throughout the day. In this regard, the computer can include a scheduling program and can programmatically associate the scheduled appointments with timeslots in that program. Further, the computer can include a mapping program, which functions to generate a pin-map (and perhaps a logical route) showing where the technician should be throughout the day. The computer may present the schedule and/or map to the technician via user interface 108 (FIG. 4).

At block 204, pursuant to the schedule and/or map, the technician then arrives at one of the customer-premises sites to perform installation and/or maintenance work. At block 206, the technician couples the computer with test meter 82 and instructs the management application to synchronize with the test meter. This test meter could be an enhanced test meter including a GPS unit. Alternatively, at block 206, where the test meter does not include the GPS receiver, the technician couples the computer with the GPS receiver and instructs the management application to synchronize with this receiver.

At block 208, the computer then responsively provides to the test meter a control signal directing that the test meter take and record particular the geopositional location information, possibly at a designated time (or when triggered by the technician or by some other triggering event).

In the exemplary arrangement, as indicated above, the control signal may be a macro or script that can be loaded into memory on the meter and executed by the meter so as to cause the meter to take one or more designated measurements. As such, the form and content of the control signal should take a form commensurate with the capabilities and expectations of the test meter. (For instance, if the test meter is capable of receiving and executing a Visual Basic or XML script, then the control signal could be a Visual Basic or XML script that encodes instructions to take particular measurements.)

Preferably, the control signal includes an indication of the CPE, or some other indication that will correlate measurements taken by the test meter with the CPE or job for which the measurements were taken. For instance, the control signal could include the account number of the CPE, the assigned sector or RSA of the CPE, or the location information of the CPE.

At block 210, the technician then positions the test meter to obtain geopositional data at the customer premises site. In turn, in response to the designated triggering event, the GPS receiver then takes the specified measurements and records the measured values, as indicated at block 212.

As indicated above, the test meter preferably records with each test measurement an indication of the measured value as well as a geopositional information and perhaps other useful data. Further, the test meter preferably records with each measurement an indication of the CPE or job for which the measurement was taken, using the identifying information that the computer had provided. For each measurement, and/or in response to a given control signal, the test meter may record all of this information in a single data set, which the test meter can thereafter readily provide to the computer.

At block 214, if the technician had uncoupled the computer from the test meter, the technician then re-couples the computer to the test meter. Alternatively, where a stand alone GPS receiver is used, the receiver would be re-coupled to the computer. And at block 216, the technician again instructs the management application on the computer to synchronize with the test meter or receiver. As a result, the computer extracts or otherwise obtains the most current location information, through an agreed data query for instance.

At block 218, the technician then instructs the management application to report customer-specific output data to the main office. In the exemplary arrangement, the technician could do this at the end of the day, for all locations that the technician visited during the day. Or the technician may do so per customer visit. Still alternatively, the computer may autonomously report the customer-specific output data to the main office.

In response, at block 220, the computer then establishes a customer-specific output record per site. As noted above, the customer-specific output record may include an indication of the CPE, as well as the measured data and corresponding location and time information. If the test meter had taken a series of measurements, then the management application may select value representing the strongest downstream signal quality. Or the management application may include multiple measures in the customer-specific output record. Further, the management application preferably includes in the customer-specific output record the measurement data that the technician obtained from within the building as well.

And at block 222, the computer then sends the customer-specific output record via link 36 to the main office. Thereafter, at block 224, the main office receives the customer-specific output record, and a computer or person may then compile and analyze the data.

Figure 8:
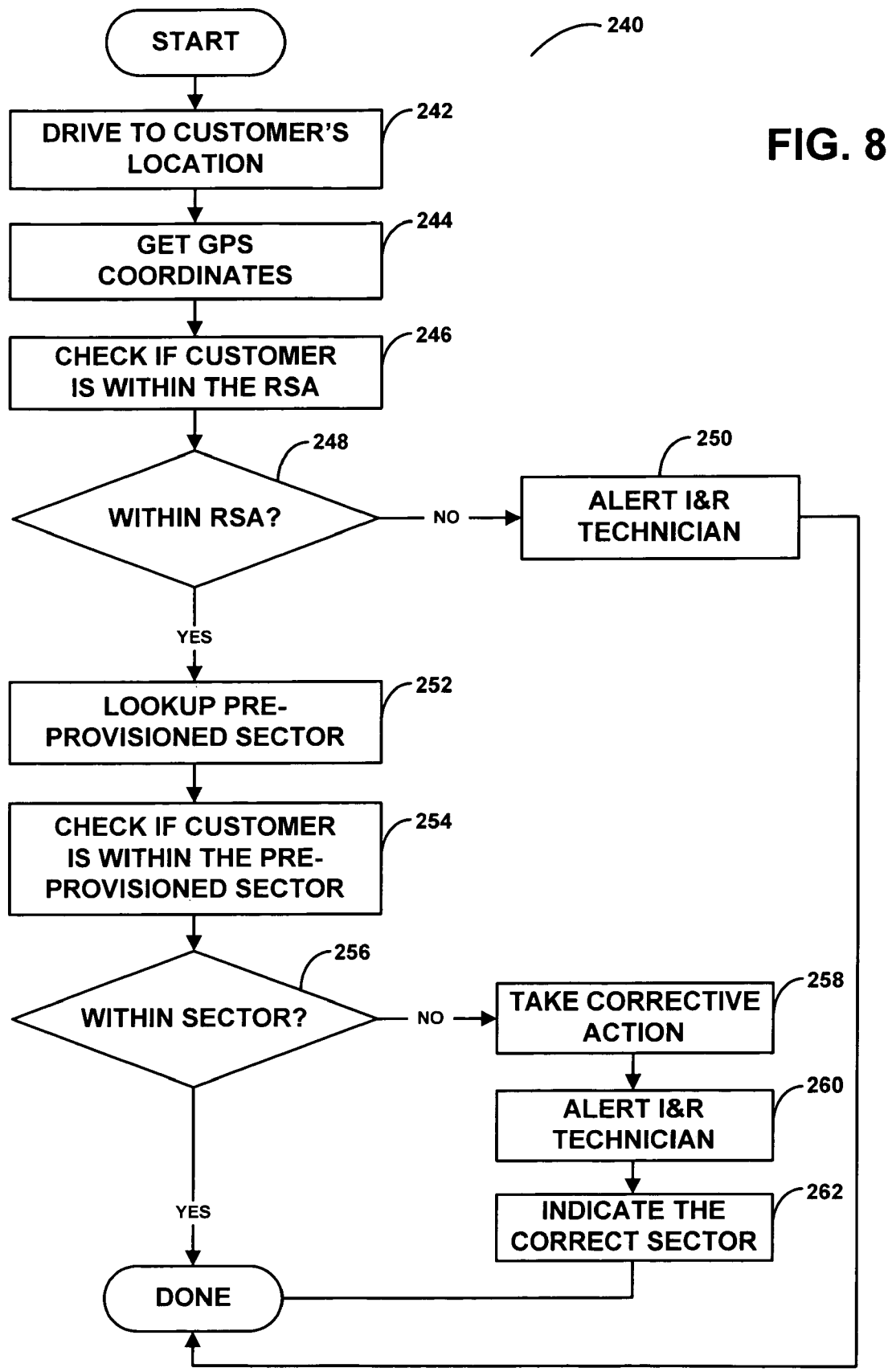
FIG. 8 is another flow chart depicting functions that may be carried out in accordance with one aspect of an exemplary embodiment.

Referring next to FIG. 8, a more detailed flow chart 240 is provided, to help further illustrate various functional aspects of an exemplary arrangement. It should be understood that the particular order of functions as set forth and described here (and in connection with other processes) can vary from that presented. Further, while some of the functions are described as being performed in response to operator input, it should be understood that some or those functions may be instead performed automatically by the computer, a GPS receiver, a test meter and/or an enhanced test unit. In fact, by automating many of these functions, an operator's performance can be better controlled and supervised, and the measurement and reporting quality can improve.

As shown at block 242 of FIG. 8, a technician drives to a customer's location. While at the customer's location, the technician obtains geopositional information (geopositional coordinates) at block 244. Once these GPS coordinates are obtained at block 244, the computer checks to determine whether the customer is physically located within an RSA at block 246. If it is determined at block 248 that the customer is physically located outside of the RSA, the technician is alerted at block 250 and the verification processes is complete. As discussed in greater detail above, corrective action can then be instituted either by the technician or this information can be communicated to the back office where further corrective action can be initiated.

If it is determined at block 248 that the customer is physically located in the RSA, the computer will perform a lookup of preprovisioned sectors at block 252. The computer will then verify to see if the customer is physically located within the preprovisioned sector at block 254. If at block 256 it is determined that the customer is located within the appropriate sector, the verification process is complete.

If at block 256 it is determined that the customer is physically located outside the preprovisioned sector, the technician is alerted at block 258. The computer can then identify the correct sector at block 260 and certain corrective action can take place at block 262.

For instance, such corrective action could include having the technician invoke a management application on the computer, which causes the computer to establish a network link with the remote access server 38 at the main office. Through that link, the computer may provide the main office with a technician-ID, and the main office may then responsively send to the computer the customer-specific input records defining the technician's installation/maintenance appointments for the current day. Further details of potential corrective action that can be instituted are discussed in greater detail above.

Exemplary arrangements of the present invention have been described. Those skilled in the art will understand, however, that changes and modifications may be made to these arrangements without departing from the true scope and spirit of the present invention, which is defined by the claims.

We claim:

1. A method of geographically verifying a fixed wireless service customer comprising the steps of: (yellow is Zendle)

assigning the fixed wireless service customer to a first wireless service sector;

obtaining geographic coordinates defining a geographic location of the fixed wireless service customer;

determining whether the geographical coordinates of the fixed wireless service customer reside within a predefined boundary of the first sector wireless service; the predefined boundary of the first wireless service sector defining in part a Response Service Area of a Multi-Channel Multipoint Distribution Service System reassigning the customer to a second wireless service sector if the geographical coordinates of the fixed wireless service customer reside outside the predefined boundary of the first wireless service sector.

2. The method of claim 1 further comprising the step of reassigning the fixed wireless service customer to a second wireless service sector if the geographical coordinates of the fixed wireless service customer reside outside the predefined boundary of the first sector.

3. The method of claim 1 further comprising the step of enabling the fixed wireless service customer to operate according to a first transmitting characteristic assigned to the first sector.

4. A method of spatially verifying a fixed wireless service customer comprising the steps of:

enabling the fixed wireless service customer to operate according to a transmitting characteristic assigned to a first wireless service sector;

obtaining geographic coordinates of the fixed wireless service customer;

determining whether the geographical coordinates of the fixed wireless service customer reside within a predefined boundary of the first wireless service sector, the predefined boundary of the first wireless service sector defining in part a Response Service Area of a Multi-Channel Multipoint Distribution Service System; and taking corrective action by reassigning the customer to a second wireless service sector if the geographical coordinates of the fixed wireless service customer is not physically located within the boundary of the first wireless service sector.

5. The method of claim 4 wherein the step of taking corrective action comprises the step of assigning a second transmission characteristic to the fixed wireless service customer.

6. The method of claim 4 further comprising the step of operating the fixed wireless service customer according to a second transmitting characteristic assigned to a second sector.

7. A method of spatially verifying a fixed point-to-multipoint wireless service customer premises equipment based on geopositional location information comprising the steps of:

providing a first wireless service sector assignment to the fixed customer premises equipment, the first wireless service sector assignment defining in part a Response Service Area;

authorizing the fixed customer premises equipment to operate according to a first transmitting characteristic associated with the first wireless service sector assignment;

obtaining geopositional location information of the fixed customer premises equipment;

confirming, based on the geopositional location information, whether the fixed customer premises equipment is located within the first wireless service sector; and responsively notifying a back office system whether the physical location of the fixed customer premises equipment resides within the first sector;

reassigning the customer to a second wireless service sector if the geopositional location of the fixed customer premises equipment resides outside the predefined boundary of the first wireless service sector.

8. The method of claim 7 further comprising the step of assigning a second sector to the fixed customer premises equipment; and operating the fixed customer premises equipment according to a second transmitting characteristic associated with the assigned second sector.

9. The method of claim 7 wherein the step of assigning a second sector to the fixed customer premises comprises the step of programming the back office system to assign the second sector assignment to the fixed customer premises equipment.

10. The method of claim 7 further comprising the step of comparing said geopositional location information to a predetermined location of said fixed customer premises equipment.

11. The method of claim 7 wherein the step of obtaining said geopositional location information of said fixed customer premises equipment comprises the step of obtaining a latitude value and longitude value.

12. A method of verifying a fixed wireless service customer equipment site comprising the steps of:

assigning the fixed wireless service customer equipment site a predetermined geographic location, the predetermined geographic location defining in part a Response Service Area of a Multi-Channel Multipoint Distribution Service System;

capturing geographic coordinates at an actual location of the fixed wireless service customer equipment site;

comparing the captured geographic coordinates to the predetermined geographic location; and taking corrective action by reassigning the fixed wireless service customer equipment site to the actual location if the captured geographic coordinates are inconsistent with the predetermined geographic location.

13. The method of claim 12 wherein the step of comparing said captured geographic coordinates of said physical location to said predetermined geographic location comprises the steps of:

receiving a customer-specific input record into a computer, the customer-specific input record identifying at least one physical location data point that is measured at the customer premises site;

applying the computer to instruct a global positioning receiver to measure at least one physical location data point at the customer premises site and to then receive from the global positioning receiver a value of the at least one physical location data point as measured at the customer premises site; and outputting a customer-specific output record from the computer, the customer-specific output record indicating the value of the at least one data point as measured at the customer premises site.

14. The method of claim 13 wherein the computer comprises the global positioning receiver.

15. The method of claim 13 wherein a test meter comprises the global positioning receiver.

16. A computer-readable medium having stored thereon instructions for causing the computer to carry out the method of claim 12.

* * * * *